US011251978B2

(12) United States Patent
Ingraham et al.

(10) Patent No.: US 11,251,978 B2
(45) Date of Patent: Feb. 15, 2022

(54) SYSTEM AND METHOD FOR CRYPTOGRAPHIC PROTECTIONS OF CUSTOMIZED COMPUTING ENVIRONMENT

(71) Applicant: BAE Systems Information and Electronic Systems Integration Inc., Nashua, NH (US)

(72) Inventors: Jonathan P. Ingraham, Pelham, NH (US); Rudra Chakravorty, Nashua, NH (US); Tate J. Keegan, Candia, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 132 days.

(21) Appl. No.: 16/618,544

(22) PCT Filed: Jun. 1, 2018

(86) PCT No.: PCT/US2018/035671
§ 371 (c)(1),
(2) Date: Dec. 2, 2019

(87) PCT Pub. No.: WO2018/223041
PCT Pub. Date: Dec. 6, 2018

(65) Prior Publication Data
US 2020/0169422 A1    May 28, 2020

Related U.S. Application Data

(60) Provisional application No. 62/514,266, filed on Jun. 2, 2017.

(51) Int. Cl.
*G06F 21/00* (2013.01)
*H04L 9/32* (2006.01)
(Continued)

(52) U.S. Cl.
CPC .......... *H04L 9/3268* (2013.01); *G06F 21/602* (2013.01); *G06F 21/606* (2013.01); *H04L 9/085* (2013.01)

(58) Field of Classification Search
None
See application file for complete search history.

(56) References Cited

U.S. PATENT DOCUMENTS 8,813,247 B1 * 8/2014 Alten ...................... G06F 21/31
726/28
9,602,290 B2   3/2017 Cizas et al.
(Continued)

FOREIGN PATENT DOCUMENTS

WO       2012126547 A1    9/2012

OTHER PUBLICATIONS

International Search Report, PCT/US18/31602, 12 pages, dated Jul. 20, 2018.
(Continued)

*Primary Examiner* — Jeffery L Williams
(74) *Attorney, Agent, or Firm* — Scott J. Asmus; Maine Cernota & Rardin

(57) ABSTRACT

A system for securely customizing a computing environment based on cryptographic protections includes providing a key device; bringing the key device proximate to a computing environment (510); beginning an authentication protocol when the user approaches the environment with the device; validating user to the key device (520); comparing certificates (525); unlocking/regenerating a device split key (530); if authentication of certificates is not valid, log & return (540); if it is valid, a full key is generated on the computing environment in volatile memory, and the full key unlocks personal settings on the computing environment (545). Using the computing environment with the personal settings
(Continued)

(550); disconnecting (555); and logging activity (560). The device can be a smart phone. Bringing the key proximate to a computing environment (510) can initiate Bluetooth or other near field communications. Initial steps can include enrolling the key (505). The environment can be a vehicle.

20 Claims, 11 Drawing Sheets

(51) Int. Cl.
*G06F 21/60* (2013.01)
*H04L 9/08* (2006.01)

(56) References Cited

U.S. PATENT DOCUMENTS

| | | | |
|---|---|---|---|
| 10,184,530 B2 | 1/2019 | Saito et al. | |
| 10,275,956 B1* | 4/2019 | Gehret | G07C 9/22 |
| 10,437,977 B2* | 10/2019 | Lambert | G06F 21/335 |
| 2007/0222585 A1 | 9/2007 | Sabol et al. | |
| 2008/0107274 A1* | 5/2008 | Worthy | G06F 21/602 |
| | | | 380/278 |
| 2009/0046860 A1* | 2/2009 | Bichler | H04L 9/0872 |
| | | | 380/270 |
| 2011/0099361 A1 | 4/2011 | Shah et al. | |
| 2013/0010956 A1* | 1/2013 | Bichler | H04L 9/0872 |
| | | | 380/259 |
| 2014/0270172 A1 | 9/2014 | Peirce | |
| 2015/0089236 A1* | 3/2015 | Han | H04W 12/10 |
| | | | 713/181 |
| 2015/0381619 A1* | 12/2015 | Kohlenberg | H04L 63/0807 |
| | | | 726/7 |
| 2016/0132046 A1 | 5/2016 | Beoughter et al. | |
| 2016/0149878 A1 | 5/2016 | Pogorelik et al. | |
| 2016/0300495 A1 | 10/2016 | Kantor et al. | |
| 2016/0362084 A1* | 12/2016 | Martin | G01C 21/34 |
| 2016/0379013 A1 | 12/2016 | Ganesan et al. | |
| 2017/0026385 A1 | 1/2017 | Zarkesh et al. | |
| 2017/0078472 A1 | 3/2017 | Ricci | |
| 2017/0093866 A1* | 3/2017 | Ben-Noon | H04L 63/10 |
| 2017/0132334 A1 | 5/2017 | Levinson et al. | |
| 2017/0345240 A1* | 11/2017 | Bergerhoff | H04M 1/72415 |
| 2018/0048674 A1* | 2/2018 | Black | H04W 12/03 |
| 2018/0215347 A1* | 8/2018 | Weghaus | B60R 25/102 |
| 2019/0173861 A1* | 6/2019 | Smith | H04L 63/10 |
| 2020/0244450 A1* | 7/2020 | Darnell | H04L 9/3297 |

OTHER PUBLICATIONS

Nhsta, Federal Automated Vehicles Policy, Accelerating the Next Revolution in Roadway Safety, U.S. Department of Transportation, Sep. 2016, 116 pages.
McAfee, Automotive Security Best Practices, Recommendations for security and privacy in the era of the next-generation car, https://www.mcafee.com/enterprise/en-us/assets/white-papers/wp-automotive-security.pdf, Jun. 2016, 23 pages.
Jim Nichols, Volvo Cars Tests Replacing Keys with Smart Phone App, https://www.media.volvocars.com/us/en-us/media/pressreleases/173880/volvo-cars-tests-replacing-keys-with-smart-phone-app, Feb. 19, 2016, 6 pages.
Extracting Qualcomm's KeyMaster Keys—Breaking Android Full Disk Encryption, https://bits-please.blogspot.com/2016/06/extracting-qualcomms-keymaster-keys.html, Jun. 2016, 20 pages.
Paul Weissler, Intel's "bumper-to-bumper" vehicle security approach, http://articles.sae.org/14753/, Apr. 19, 2016, 2 pages.
Meiyuan Zhao, Advanced Driver Assistant System, http://www.intel.com/content/dam/www/public/us/en/documents/white-papers/advanced-driver-assistant-system-paper.pdf, May 28, 2016.
Terry Costlow, V2X communications face many challenges before deployment, http://articles.sae.org/12841/, Mar. 6, 2014, 2 pages.
International Search Report, PCT/US18/35671, dated Oct. 17, 2018, 12 pages.
International Search Report, PCT/US18/44355, 9 pages, dated Oct. 30, 2018.

* cited by examiner

SECURELY CUSTOMIZED COMPUTING ENVIRONMENTS

GENERALIZED CUSTOMIZED COMPUTING ENVIRONMENT CONFIGURABLE COMPONENTS

VEHICLE CUSTOMIZED COMPUTING ENVIRONMENT CONFIGURABLE COMPONENTS

KEY MANAGEMENT

COMPUTING ENVIRONMENT SECURITY METHOD HIGH LEVEL STEPS

ENROLL KEY DEVICE

USER VALIDATION

LOGGING ACTIVITY

UPLOADING DATA

EXAMPLE SCENARIO

SYSTEM AND METHOD FOR CRYPTOGRAPHIC PROTECTIONS OF CUSTOMIZED COMPUTING ENVIRONMENT

RELATED APPLICATIONS

This application claims the benefit of U.S. Provisional Application No. 62/514,266 filed Jun. 2, 2017, which is herein incorporated by reference in its entirety for all purposes. U.S. Provisional Application 62/503,003 filed May 8, 2017, U.S. Provisional Application No. 62/540,264 filed Aug. 2, 2017, and PCT Application No. PCT/US2018/031602 Filed May 8, 2018 are herein incorporated by reference in their entireties for all purposes.

FIELD OF THE DISCLOSURE

Embodiments relate to a system and method for securely customizing computing environments for a user based on cryptographic protections and, more particularly, to utilizing a portable device to unlock and customize entity/vehicle/computing environments and to protect/authenticate any data extracted from the entity/vehicle/computing environment.

BACKGROUND

Computing environments are abundant and expanding. A car unlocks, adjusts seats, loads contacts and playlists, has navigation locations loaded, streams paid content, etc. A hotel room unlocks, has the temperature preset, TV stations preset, Netflix content loaded, and an iPad automatically connects to Wi-Fi. Similarly, a personal computer unlocks, loads website content, sets user preferences and loads files.

The move to integrate phones and the personal data within, for example, a vehicle's computing environment brings into question the protection of that personal data. Personal privacy, the rise of infotainment within vehicles, and streaming data into and out of vehicles demands strong privacy protections. Further, with the advent of self driving technology, there are issues regarding assigning responsibility in the event of an incident/accident (either to the manufacturer or the individual). Current methods for accessing vehicles/computing environments are not cryptographically based or immutable, nor is the user data within those computing environments opaque to computing processes or other users who do not have authorization to see/process the user data. This allows a broad attack surface for cyber and reverse engineering threats which will continue to emerge as the modern automobile becomes even more connected and more software centric.

Continuing with the vehicle computing environment example, modern automotive platforms (light & heavy duty) are internet connected and susceptible to attack and reverse engineering as evidenced by the 2015 Jeep Cherokee remote hack. This is a target-rich environment for attackers, because physical access is readily available, and there are currently limited protections or regulations. Particularly, the connected automotive platform is considered one of the next big cyber attack surfaces for hackers. The problems to be solved include the protection of intellectual property, limiting OEM and end user liability, protecting the end user's data, and ensuring availability to the end user.

Concerning these problems, many threats exist, including attacks via the vehicle's wireless and cellular interfaces, as well as from devices plugged into a vehicle Controller Area Network (CAN) bus through the On-Board Diagnostics (OBD) port. It has been shown that a Trojan horse or other malicious code can be installed through updates when physical access to the OBD port is available, or remote access via wireless or cellular connectivity is available. Vulnerabilities have been proven such as in 2013 when Charlie Miller and Chris Valasek hacked a Prius, and their remote hacking of a Jeep in 2015. Remote access was through the Harman Kardon radio and a Uconnect computer, which gave them access to the vehicle's systems through the cellular carrier Sprint used by Chrysler. This initiated the first ever cyber-security motivated recall, impacting 1.4 million vehicles. Access could also come from aftermarket devices such as insurance dongles, OBD II scanners, aftermarket programmers or controllers, cell phones, and their related Apps. When it is considered that some vehicles rely on over 100 million lines of code, the complexity of the problem is apparent. Recall resolution software update problems have further demonstrated the difficulties involved in securing vehicle systems. Even some cryptographic protection techniques are vulnerable to reverse engineering attacks if the key management architecture is not of sufficient strength, if the critical keys are not unique per vehicle/entity, or the keys are not sufficiently protected using hardware based protection techniques. Researchers reverse engineered a component in a Volkswagen's internal network. They extracted a single cryptographic-key value shared by millions of Volkswagen vehicles. They did this by intercepting another value unique to the target vehicle and sent every time a driver presses the key fob buttons. The two supposedly secret values can be combined to clone the key fob and access the car. Even central servers that provide Over The Air (OTA) updates have vulnerabilities and need to incorporate cyber protection. Recently, security researcher Benjamin Kunz Mejri revealed zero-day vulnerabilities that reside on BMW's web domain and ConnectedDrive portal. One is a VIN (Vehicle Identification Number) session vulnerability which resides on the official BMW ConnectedDrive online service web-application.

Similar problems have long been felt in the computer environment. A personal computer may be taken over with malware, used as a zombie bot in an attack, held for ransom, or have personal data exfiltrated off of it. While the precedent is currently that only the hacker is at fault, this could change, and the manufacturer of the hardware/software or the end user may eventually be considered liable. For example, flaws were recently discovered in Intel silicon allowing for the "Meltdown" and "Spectre" hacks. These security flaws in the silicon have been in existence for 20 years. Exploitation of flaws of this nature for a large scale cyber attack of financial consequence may change existing precedent concerning liability.

Additionally, the entity/vehicle/computing environment generates data, some of which is in response to the configurations applied by the input personal data. This generated data has value both to the generating user, the OEM, and third parties. In the vehicle example, data generated by on board sensors such as LIDAR, rain sensing wipers, forward and rear-facing cameras, or accelerometers can report map data, weather data, or traffic and road condition data to third parties via OTA connections. Data generated by sensors such as a brake pad wear sensor or oil clarity sensor could notify the OEM, consumer or third party that vehicle maintenance was required. However, this data is of less value if it cannot be determined to be authentic, and the extraction of this data has personal privacy implications for the user of the vehicle.

What is needed are cryptographic protections to personal and generated data such that an attacker with access to an entity/vehicle/computing environment cannot gain access to the personal data other than through a brute force cryptographic attack, and the generated data can be determined to be authentic.

SUMMARY

An embodiment provides a system for securely customizing a computing environment for a user based on cryptographic protections comprising providing a key device; bringing the key device proximate to the computing environment (505); authenticating comprising at least one of comparing key device and computing environment certificates (510); determining if previously enrolled for split key protections (515); if not enrolled, enrolling the key device (520); if enrolled, regenerating split key (525); unlocking personal settings (530); using the computing environment with at least one of the personal settings and data (535); deprogramming the key device (540); and logging activity (545); whereby data and preferences are cryptographically protected. In embodiments the in the step of deprogramming, user data and information that may reside on the computing environment is made opaque via encryption and signing. In other embodiments, configurable components comprise: Payment information (210); User preferences (215); Environment generated data (220); User input data (225); User history (230); Privacy settings (235); Purchased content and content settings (240); User personally identifiable information (245); Environmental settings (250); Performance settings (255), and a Cloud connection (260). In subsequent embodiments elements of the customized environment comprises at least one of: vehicle over the air (OTA) communications (310); Bluetooth communications (315); Dedicated Short-Range Communications (DSRC) vehicle to everything (V2X) communications (320); passive keyless entry (325); remote key (330); Advanced Driver Assistance Systems (ADAS) (335); lighting system (interior and exterior) (340); engine and transmission performance (345); steering and braking performance (350); vehicle access systems (355); and remote link type apps (360). For additional embodiments key management comprises at least one of: a key in the user's device (405); a key in an automotive CPU (410); an exclusive or (XOR), wherein either the key in the user's device (405) or the key in an automotive CPU (410) is true (415); producing at least one of user and vehicle key(s) (420); verifying and decrypting (425); encrypting user files with the at least one user/vehicle key(s) (420) (430); and decrypting the user files and executing in volatile memory (435). In another embodiment, the customized computing environment comprises at least one of: a vehicle (110), a home interior (125), a hotel room (130), an office (135), an aircraft interior (140), a computer (145), a training simulator (155), a website content (160); a connection to a cloud (165). Following embodiments further comprise enrolling the key device (520), the step of enrolling (520) comprising: generating a strong master secret (605); splitting sad strong master secret (605) into multiple shares for the key device and customized computing environment (610); distributing and storing shares (615); and logging activities (620). In subsequent embodiments user validation (510) comprises: sending credentials (715); receiving credentials (720); authenticating credentials (725); confirming credentials match (730); logging and returning if credentials do not match (735); communicating with computing environment if credentials do match (740); and logging activities (745). In additional embodiments the step of unlocking (530) comprises: receiving a split key through a secure transaction mechanism (805); XOR split key to recreate total key (810); verifying and decrypting at point of use (815); and logging activities (835). In included embodiments the step of logging activity (560) comprises: creating a record (905); adding all data to the record (910); encrypting and signing the record (915); and saving the record (920). In yet further embodiments uploading data comprises: determining which data to upload (1005); for restricted access or black box data (1010): extracting data records to upload (1015); encrypting and signing the data records (1020); transmitting via OTA (1025); and logging activities (1030); for streaming sensor data (1035): extracting data records (1040); signing at a minimum to ensure authenticity and integrity, or encrypting and signing for greater protections (1045); transmitting via OTA (1025); and logging activities (1030). In related embodiments the full key generated on the computing environment uses a stored second half of split key. Further embodiments comprise separate keys for decryption and authentication such that there are multiple split values and multiple exclusive ors (XORs) to arrive at one key for decrypting and another for authenticating. In ensuing embodiments the computing environment comprises at least one of: a vehicle; and wherein elements of the customized environment comprise: vehicle Over The Air (OTA) communications (310); Bluetooth communications (315); Dedicated Short-Range Communications (DSRC) vehicle to everything (V2X) communications (320); passive keyless entry (325); remote key (330); Advanced Driver Assistance Systems (ADAS) (335); lighting system (interior and exterior) (340); engine and transmission performance (345); steering and braking performance (350); vehicle access systems (355); and remote link type apps (360). For yet further embodiments, the computing environment comprises at least one of: a vehicle; and wherein the configurable components comprise: Payment information (210); User preferences (215); Environment generated data (220); User input data (225); User history (230); Privacy settings (235); Purchased content and content settings (240); User personally identifiable information (245); Environmental settings (250); Performance settings (255), and a Cloud connection (260).

Another embodiment provides a method for securely customizing a computing environment for a user based on cryptographic protections comprising: providing a key device; bringing said key device proximate to said computing environment (515); authenticating comprising comparing ate least one of key device and computing environment certificates (510); determining if previously enrolled for split key protections (515); if not enrolled, enrolling said key device (520); if enrolled, regenerating split key (525); unlocking personal settings (530); using said computing environment with at least one of said personal settings and data (535); deprogramming said key device (540); and logging activity (545); wherein all data and preferences are cryptographically protected via split key execution in at least one of volatile memory and a virtual machine and one half of said split is held by said user key device. For more embodiments the computing environment comprises a personal computer. In another embodiment the computing environment comprises a training simulator (155). Continued embodiments include deprogramming comprising memory power cycling (540).

A yet further embodiment provides a system for securely customizing a computing environment for a user based on cryptographic protections comprising: providing a key device; enrolling the key device (520) comprising: generating a strong master secret (605); splitting sad strong master secret (605) into multiple shares for key device and customized computing environment (610); distributing and storing shares (615); and logging activities (620); bringing the key device proximate to the computing environment (505);5 authenticating (510); at least one of unlocking and regenerating a split key of the device (525, 530); if authentication of the certificates is not valid, log and return to the step of bringing the key device proximate to the computing environment; using the computing environment with the personal settings (535), wherein using the computing environment with the personal settings (535) comprises configurable components comprising: Payment information (210); User preferences (215); Environment generated data (220); User input data (225); User history (230); Privacy settings (235); Purchased content and content settings (240); User personally identifiable information (245); Environmental settings (250); Performance settings (255), and Cloud connection (260); deprogramming (540); and logging activity (545); wherein the customized computing environment is at least one of: a personal vehicle (110), a home interior (125), a hotel room (130), an office (135), an aircraft interior (140), a computer (145), a training simulator (155), a website content (160); a connection to a cloud (165) wherein all data and preferences are cryptographically protected via split key execution in at least one of a volatile memory and a virtual machine and one half of the split is held by the user key device.

Figure 1:
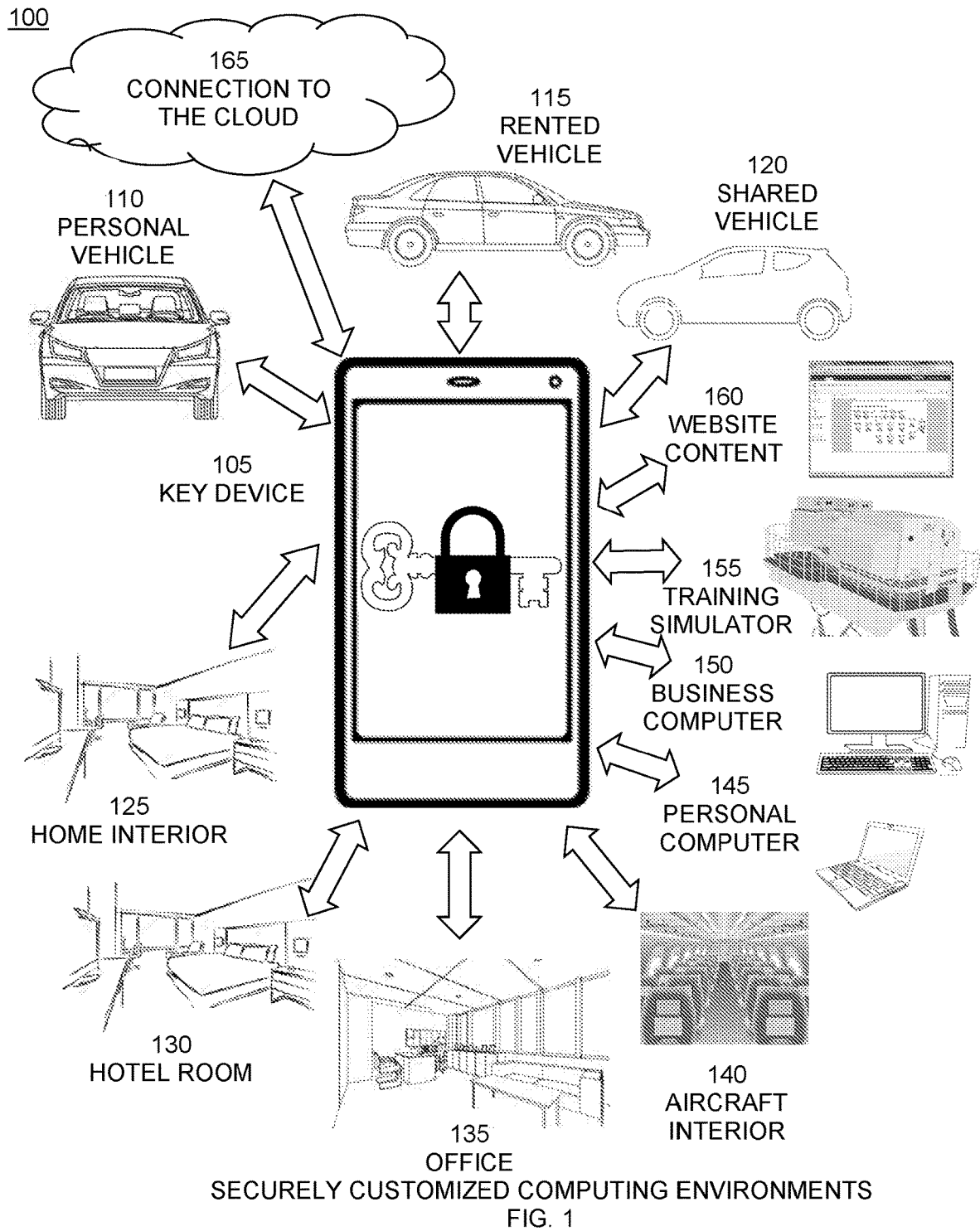
FIG. 1 depicts securely customized computing environments configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments provide a method not only to use a device as an identity authenticator for a specific computing environment, but also to provide cryptographic protections of data within that environment. In embodiments, all data and preferences are cryptographically protected via split key execution in volatile memory. Benefits include providing consumer privacy protections (as required by some European markets), giving the end user control over their data via a strong protection for opt in/opt out style data services, protecting the confidentiality, authenticity, and integrity of the data at rest, authentication of extracted data, and enhanced user experience.

Embodiments extend to environments including personal vehicles, rental vehicles, shared vehicles, aircraft interiors, hotel rooms, office spaces, home interiors, personal computers, business computers, training simulators, and website content. The vehicle environment is used for nonlimiting examples.

Using cryptographic methods, the vehicle/computing environment settings, including privacy settings and infotainment, can not only be tailored, but protected from exploitation. In embodiments, these methods are extended to the vehicle black box data and any vehicle sensor data which may be extracted, such that the consumer has control over any data recorded by the vehicle and offloaded or extracted from the vehicle.

Benefits include end user data protection, end user identity protection, OEM intellectual property separation between OEM and customer content, and enhanced end user experience. End user data protection protects data input into the vehicle/computing environment by the end user, and the data the vehicle/computing environment generates (location, purchase preference, velocity, environmental data, maintenance, sensor data, etc.). End user identity protection comprises protecting user preferences, environment generated data, user input data, user history, privacy settings, purchased content and settings, personally identifiable information, environmental settings, performance settings, and payment information. OEM intellectual property separation comprises segregating the execution of OEM intellectual property from end user data. Enhanced user experience comprises automated transfer of data and settings between computing environments with robust cryptographic protections. Embodiments retrofit into existing products; they scale to large and small networks (CAN bus to Ethernet speeds). They are updatable and portable as hardware evolves.

Separation of user data and OEM's intellectual property can be accomplished through the use of shared memory architectures, memory management units, or dedicated hardware processors for user data processing. This segregates user data and settings from the OEMs intellectual property, providing an enclave for the user's data, settings, and personally identifiable information to execute within volatile memory segregated from the rest of the computing environment. This provides separation between the user's data and settings, and the OEMs intellectual property and/or proprietary algorithms and code.

When properly enrolled and authenticated, the user can be verified as an authorized user for the computing environment. By implementing cryptographically immutable keys with a key device, and tying that to the vehicle/computing environment, the authenticity of the vehicle/computing environment and driver/user can be verified by cryptographic methods. Cryptographically immutable event log data is recorded by the vehicle/computing environment, and cryptographically bound to the user, to record vehicle/computing environment state during an incident, for the vehicle example.

FIG. 1 depicts securely customized computing environments 100. Shown are a key device such as a smart phone 105. Computing environments that are securely configurable comprise personal vehicle 110; rental vehicle 115; shared vehicle 120; home interior 125; hotel room 130; office 135; aircraft interior 140; personal computer 145; business computer 150; training simulator 155; website content 160; and cloud connection 165. While a smart phone is envisioned as the mechanism for the key, in embodiments the communications involving the key transport can be in the cloud. As examples, configurable items in a home interior can comprise alarm settings, TV settings, temperature set points, lighting, shades, smart home devices, and picture displays on walls. Examples for configurable vehicle environment settings comprise vehicle over the air (OTA) communications, Bluetooth communications, Dedicated Short-Range Communications (DSRC) vehicle to everything (V2X) communications, passive keyless entry, remote key, Advanced Driver Assistance Systems (ADAS), lighting system (interior and exterior), engine and transmission performance, steering and braking performance, vehicle access systems, remote link type apps, other infotainment and paid content, and environment or sensor generated data extracted from the vehicle.

In embodiments, rather than a smart phone, a secondary authentication device is utilized. This device could combine biometrics with key storage and may include a 2 factor authentication source. The device could also allow for data entry such that the user could input their key.

Figure 2:
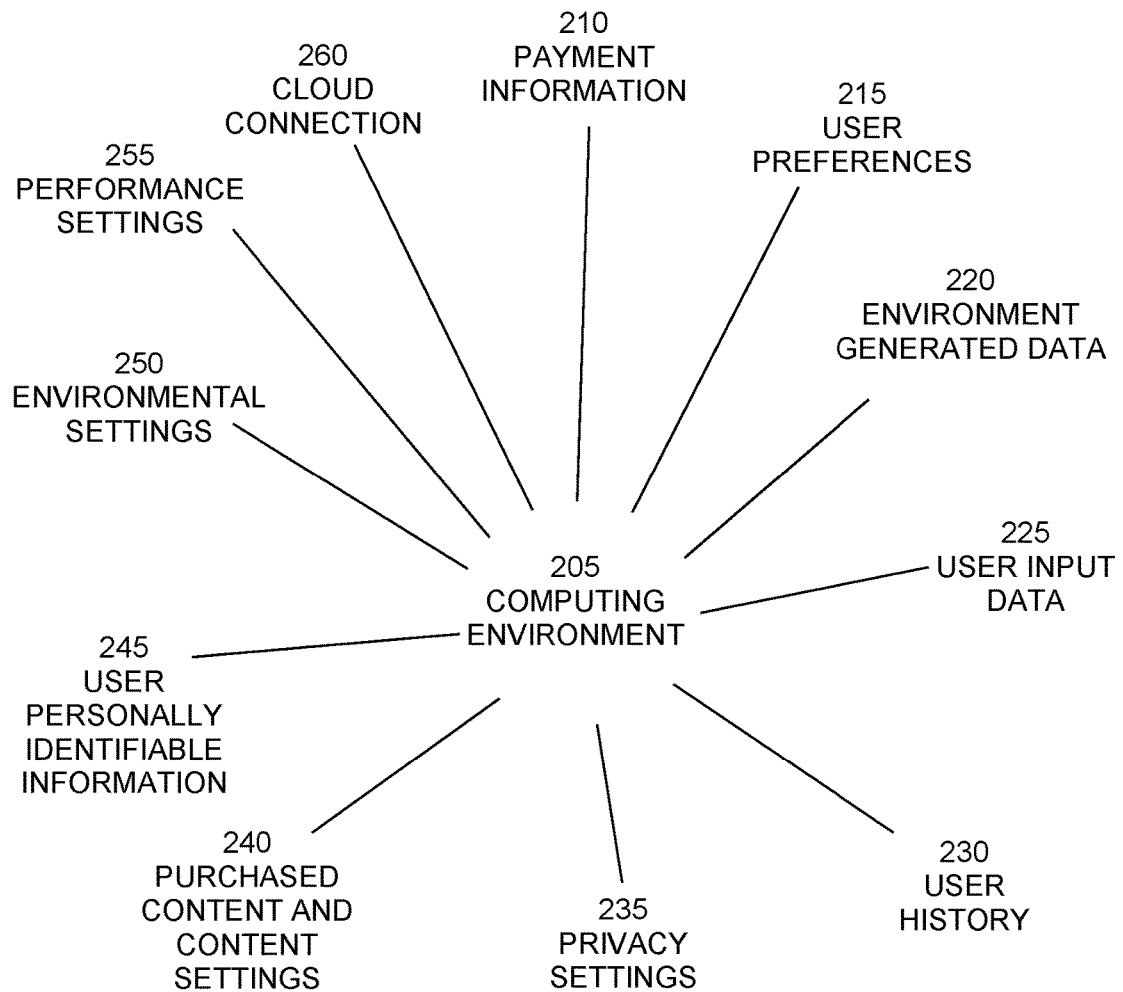
FIG. 2 depicts configurable components of a generalized computing environment configured in accordance with an embodiment.

FIG. 2 depicts configurable components of a generalized and customized computing environment 205. The User's data and settings are represented as, but not limited to, the spokes. Configurable components comprise Payment information 210; User preferences 215; Environment generated data 220; User input data 225; User history 230; Privacy settings 235; Purchased content and content settings 240; User personally identifiable information 245; Environmental settings 250; Performance settings 255, and Cloud connection 260. As mentioned above, while a smart phone itself may be a mechanism for the key, in embodiments much of the communications is in the cloud and configurations for cloud communicating may be customized. User data is protected via user device bound split keys where one half of the split is held by the user's device and the second half by the computing environment. The execution of sensitive information is within volatile memory where any application(s) needing access to user data is separate, and shares data in a trusted and prescribed manner to protect the user data. Embodiments may also employ public/private keys in the protection of user and/or OEM data.

Figure 3:
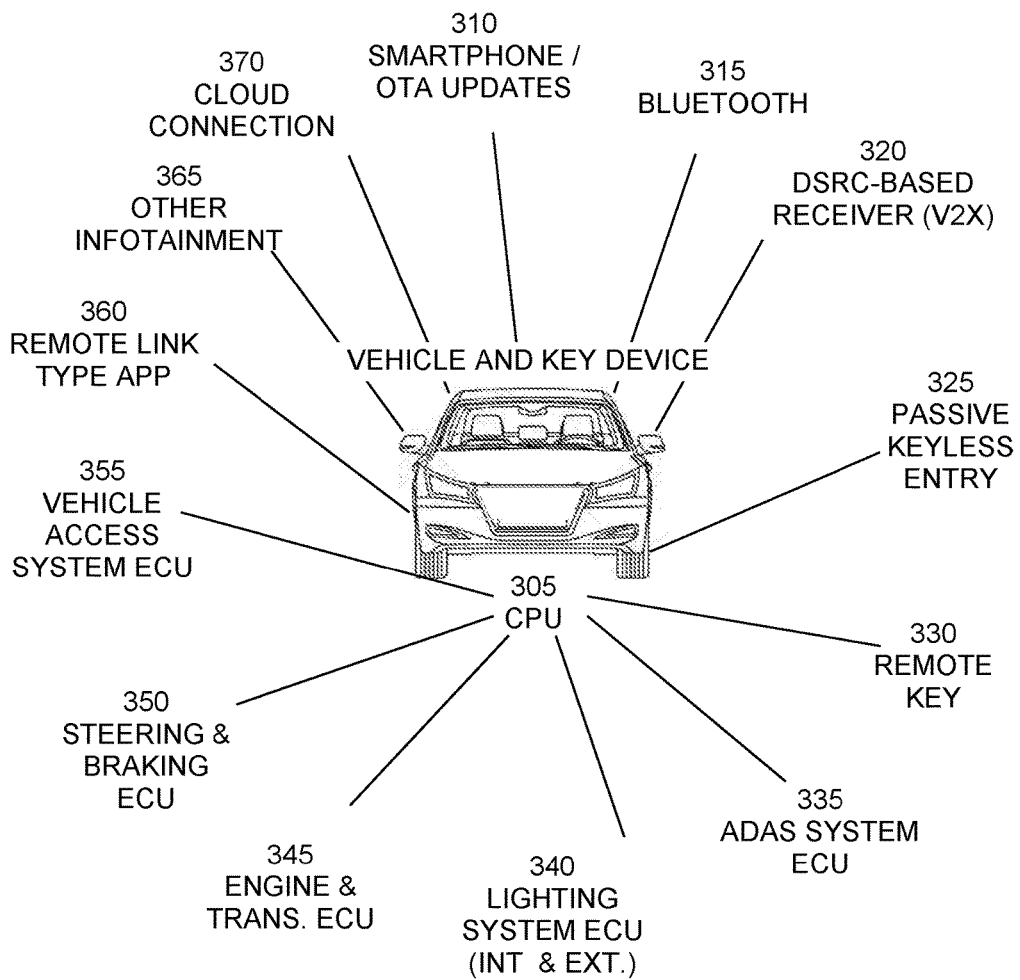
FIG. 3 depicts a vehicle computing environment example, configured in accordance with an embodiment.

FIG. 3 depicts an example vehicle environment 300. Vehicle computing environment components interface with vehicle CPU 305, and the vehicle CPU interfaces with the user device and its device bound split keys. Securely configurable components comprise vehicle over the air (OTA) communications 310; Bluetooth communications 315; Dedicated Short-Range Communications (DSRC) vehicle to everything (V2X) communications 320; passive keyless entry 325; remote key 330; Advanced Driver Assistance Systems (ADAS) 335; lighting system (interior and exterior) 340; engine and transmission performance 345; steering and braking performance 350; vehicle access systems 355; remote link type apps 360; other infotainment and paid content 365; and cloud connection 370.

Figure 4:
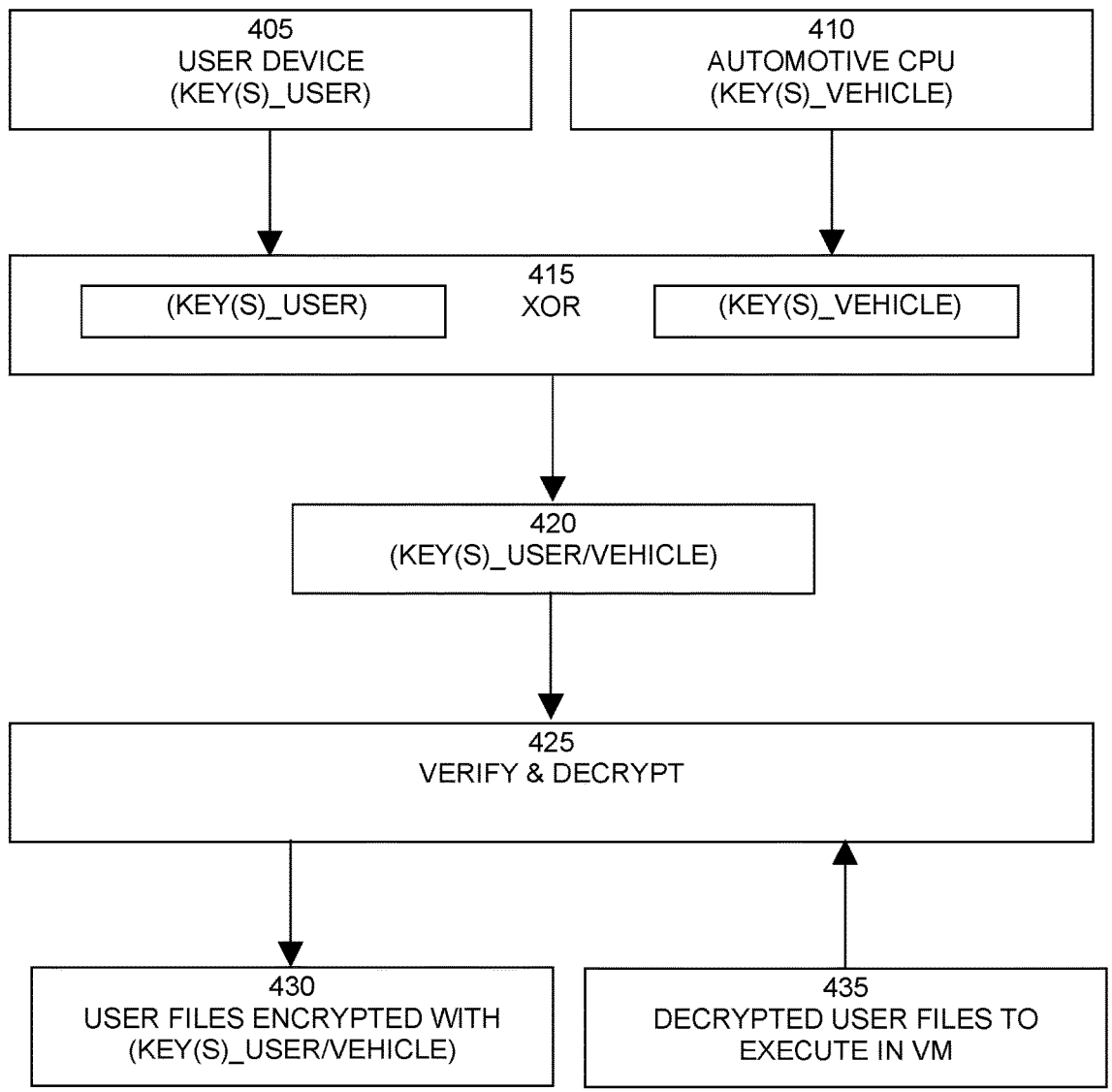
FIG. 4 is a high level block diagram of a generalized computing environment security system configured in accordance with an embodiment.

FIG. 4 is a high level block diagram 400 of components of split key management in a securely configured user computing environment. Depicted are the key in the user's device 405 and the key in the automotive CPU 410. In embodiments, user device key (KEY(S)_USER) 405 is a 256 bit AES key and automotive key (KEY(S)_VEHICLE) 410 is a 256 bit AES key. Other embodiments use larger or smaller key values depending on implementation. The XOR of these two items 415 then unlocks the encrypted content on the computing environment/cloud/or device. Embodiments are not limited to two key splits, and as such, at least two key splits are utilized to ensure data protections. The (Key(s)_user/vehicle) 420; then verifies & decrypts 425; user files are encrypted with (Key(s)_user/vehicle) 430; and decrypted user files execute in volatile memory 435. Embodiments have separate keys for decryption and authentication such that there are multiple split values and multiple XORs to arrive at one key for decrypt and another for authenticate. As mentioned, embodiments are not bound to just a single key split. For example, FIG. 6 does not limit the number of keys. For embodiments, it is possible to XOR more than a single key split such that 4 or 5 splits are put together from various storage locations in the device and the computing environment. Using multiple splits, as a nonlimiting example, with two users (parents) in the vehicle together; it unlocks the children's content within the rear seat of the vehicle, or locks out content so the children cannot see explicit or denied content such as music with explicit lyrics. In this example, the XOR of Child_key, Parent_key_1, Parent_key_2, and computing environment key would be required for explicit content, whereas Child_key, Parent_key_1 and computing_environment_key would be required for basic content.

Figure 5:
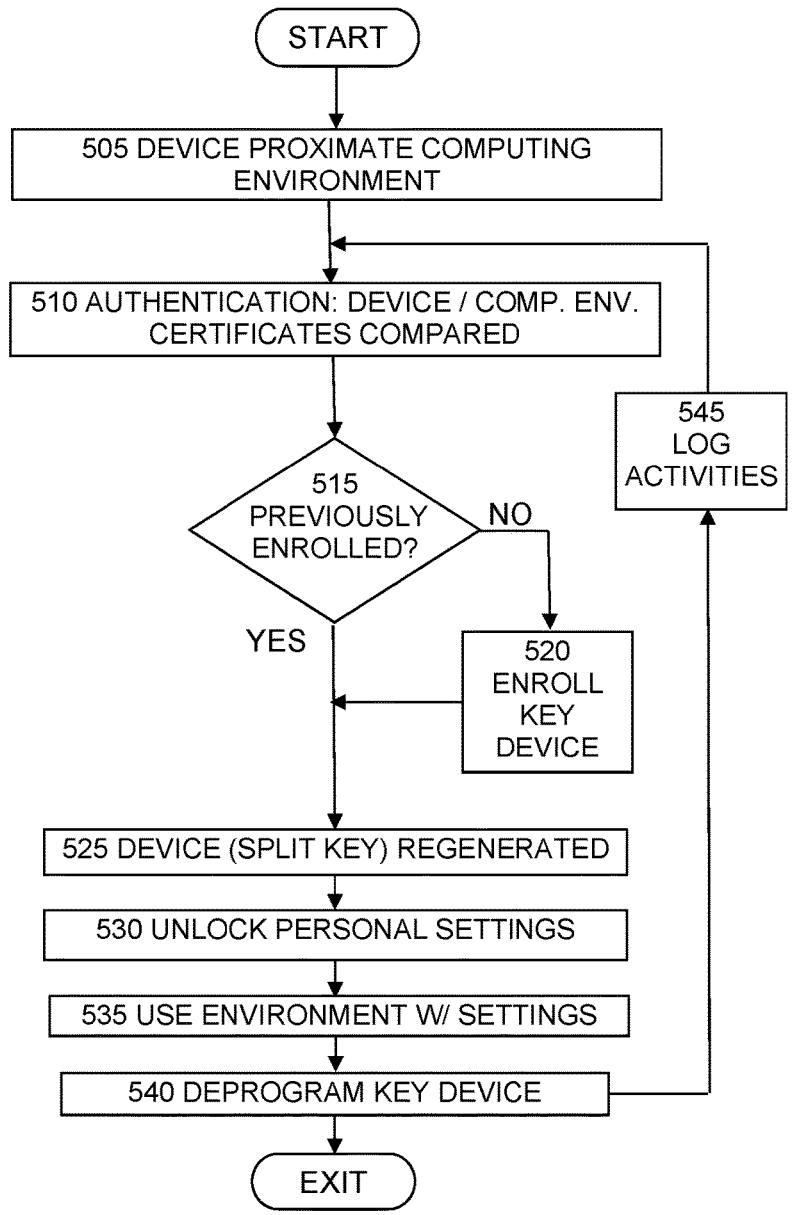
FIG. 5 is a high level flowchart of a customized computing environment security method configured in accordance with an embodiment.

FIG. 5 is a high level flowchart 500 of steps for a customized computing environment security method. The key device is moved to be proximate to computing environment 505; in embodiments this is with Bluetooth, WiFi, or other near field communications. In one example the computing environment is a vehicle, wherein vehicle refers to a moving platform such as a car, truck, boat, drone, or plane. Authentication 510 is shown in detail in FIG. 7 and authenticates that the user of the key device is authorized by the cryptography based validation of certificates based on a certificate authority, X.509, in one embodiment. In one embodiment, bringing the device proximate to the computing environment automatically begins the authentication protocol 510, in another embodiment, the user must interact with the device and/or app to begin the authentication protocol 510 such as at initial certificate enrollment. There are various authentication mechanisms such as passwords and biometrics that can be employed by the device and the app. Upon proper authentication, the device/computing environment certificates are compared 510 in order to confirm the device and the computing environment have the proper certificates in place to communicate securely. Once the certificates are confirmed, a secure communications channel is established between the device and the computing environment such that data may be passed between the two in a trusted manner. In some embodiments this may be via SSL, in other embodiments this may be via other public or proprietary algorithms.

Once the secure communications channel has been established, the device and computing environment determine if they are previously enrolled for split key protections, 515. If previously enrolled, they continue to the key regeneration steps. If not previously enrolled, the split key enrollment process begins 520.

The enrollment process steps comprise generating and storing to non-volatile memory a series of key splits in both the device and the computing environment 520; in embodiments the device is a smart phone with an app that contains validated cryptographic certificates (X.509) which would be signed by a trusted certificate authority, algorithms (AES, PKI, blockchain, etc), and communications protocols (SSL, HTTPS, etc). In further embodiments the device is a biometric fob or dongle with similar validated cryptographic certificates, algorithms and communications protocols. Additional embodiments contain a two factor authentication source.

Once the device and the computing environment are authenticated, communicating securely and enrolled, the split key regeneration process may begin 525. The secure communications channel is used to transport the device authentication key split(s) to the computing environment. Once in the computing environment, the authentication key split(s) from the device is combined with the authentication key split(s) from the computing environment. The XOR of these splits must successfully authenticate the encrypted (opaque) data. If the authentication passes, the decryption key split(s) is requested from the device. The device decryption key split(s) is passed over the secure communications channel to the computing environment where it is XORed with the computing environment key split(s). The computing environment can then use this key split to decrypt the opaque user data/personal items 530. The combined master key, which is the combination of the key splits, can be used to decrypt the encrypted data. This data could be the user data or a key ring, or collection of keys used to authenticate and encrypt/decrypt the user and/or OEM data.

Any execution step failures result in logging 545 of activities. All logging occurs on the computing environment, and in some embodiments may also occur on the device. If the authentication fails, the device is assumed to remain proximate to the computing environment, whereby authentication may be attempted again. In one embodiment this would occur automatically for a set number of attempts, in another embodiment the user may have to request subsequent attempts. In a further embodiment, the device may report errors detailing the failure reason to the user.

The key device and the computing environment can handle multiple key splits according to one example, and will enable access as long as the execution session is not terminated via deprogramming. Once access is enabled, the environment with personal settings can be reviewed, added, or modified, and data may be extracted/offloaded-uploaded 535 (see FIG. 10). For example, in a vehicle example, the seat settings, phone contacts, temperature settings, and other vehicle parameters can be established such that the user's device would transport the settings from their personal vehicle to their rental vehicle. Updates made in the rental vehicle could then be securely transferred to the smart device, and subsequently, back to the cloud for backup and to extend to other devices and/or vehicles.

Upon a set time out period, user selection, or other indication, the system executes a deprogram 540. Upon deprogramming, the user data and information that may reside on the computing environment is made opaque via encryption and signing. The system typically will log activities 545 and note the date/time as well as certain parameters of the interaction. In one embodiment, deprogramming constitutes erasing all user data (which is encrypted/opaque) from NVM, and clearing volatile memory including reconstituted keys. In another embodiment deprogramming constitutes adding new user data to the file(s) stored in the computing environment, encrypting and signing that data with the split keys, and storing that data to NVM before clearing volatile memory including reconstituted keys. In another embodiment deprogramming constitutes adding new user data to the users file(s), encrypting and signing that data with the desired keys, uploading that data to the device or the cloud, and clearing volatile memory including reconstituted keys. In all embodiments, deprogramming includes the clearing of volatile memory including reconstituted keys, and ensuring all user data in NVM is encrypted and signed.

Regarding split key implemented embodiments, if a user's data is encrypted in the cloud with split keys, all splits are required to verify and decrypt it, whereas this is not the case for PKI or blockchain embodiments.

While the following rental vehicle example is implicit from the combination of other Figures, it is provided for additional clarification. To implement a method embodiment for cryptographic protections of driver data. 1. Use device with Bluetooth or Near Field Communications as the 'key' to the vehicle. 2. The vehicle and device communicate via an Interface Communications Document (ICD). 2a. This ICD would define an encrypted, authenticated channel (such as SSL) between the device and the vehicle such that all data passed over the channel would be secure. This channel would be based on certificates signed by designated certificate authorities contained in the vehicle and the device app. 3. When user first approaches the vehicle with the device, the authentication protocol begins. If the authentication is valid (certificates agree) the device app and the vehicle enter the split key enrollment process. 4. The User interacts with their device and may enter biometric features or a password on the device. This generates, distributes to the device, and stores the split keys. 4a. A secondary input mechanism could be the vehicle infotainment controls in embodiments. 4b. A tertiary input mechanism could be a biometric fob or dongle in embodiments. 5. The vehicle CPU generates and stores the second half of the split keys. 5a. All key splits would preferably be hardware based such as via a Physically Unclonable Function (PUF) as opposed to key ring based. 6. The user data and settings and key splits are transferred to the vehicle computing environment via the secure communications channel. 7. The vehicle computing environment XORs the key splits and encrypts and signs the user's data such that it is opaque to other users or computing processes when stored in NVM. 7a. Maintaining half of the key in the device ensures that the encrypted data on the vehicle computing environment is secure when not in use. 8. The vehicle computing environment transmits data and settings to the device such that the device is now a 'key' for the vehicle (both for data and to operate the vehicle). 9. When the user and their device are proximate to the vehicle computing environment, the device is the 'key' for the computing environment, allowing for vehicle operation and for the authentication, decryption and execution of the user's personal data and settings, including but not limited to infotainment settings, paid content, climate control settings, seating position, radio presets, data extraction preferences, etc. 10. The split keys are also utilized to encrypt any vehicle black box data generated to ensure the confidentiality, authenticity, and integrity of that data. 10a. This data can be uploaded either to the cloud via OTA or to the device since it is encrypted (see also FIG. 10). The ICD can include a way to regenerate the vehicle half of the key such that the user is able to authenticate and decrypt their data in the cloud. In scenarios for key management simplification, a step is included where the data is re-encrypted with a public/private key pair for upload to the cloud. Here, data is placed in the cloud with a public/private key pair to limit user and vehicle interaction if that data is data the user is willing to release to a third party, or that data requires less protection. This would be the case of selling vehicle generated sensor data to a third party. 11. Full key, unencrypted vehicle black box data, and any user personal data only ever executes in volatile memory regions of the computing environment such that a deprogramming event or power cycle clears plaintext (non-opaque) user data and keys. 12. When the rental session is over, the user interacts with the device and issues a final deprogramming event such that all encrypted user data is deleted from the vehicle computing environment after being synced as necessary with the device or cloud. 13. In the case where the user does not issue a deprogramming event, their personal data is secured via encryption once the vehicle is power cycled. In the rental car, this provides a seamless experience where the user has all their pre-defined settings and content, but is assured their personal data is not left exposed at the end of their rental session.

Figure 6:
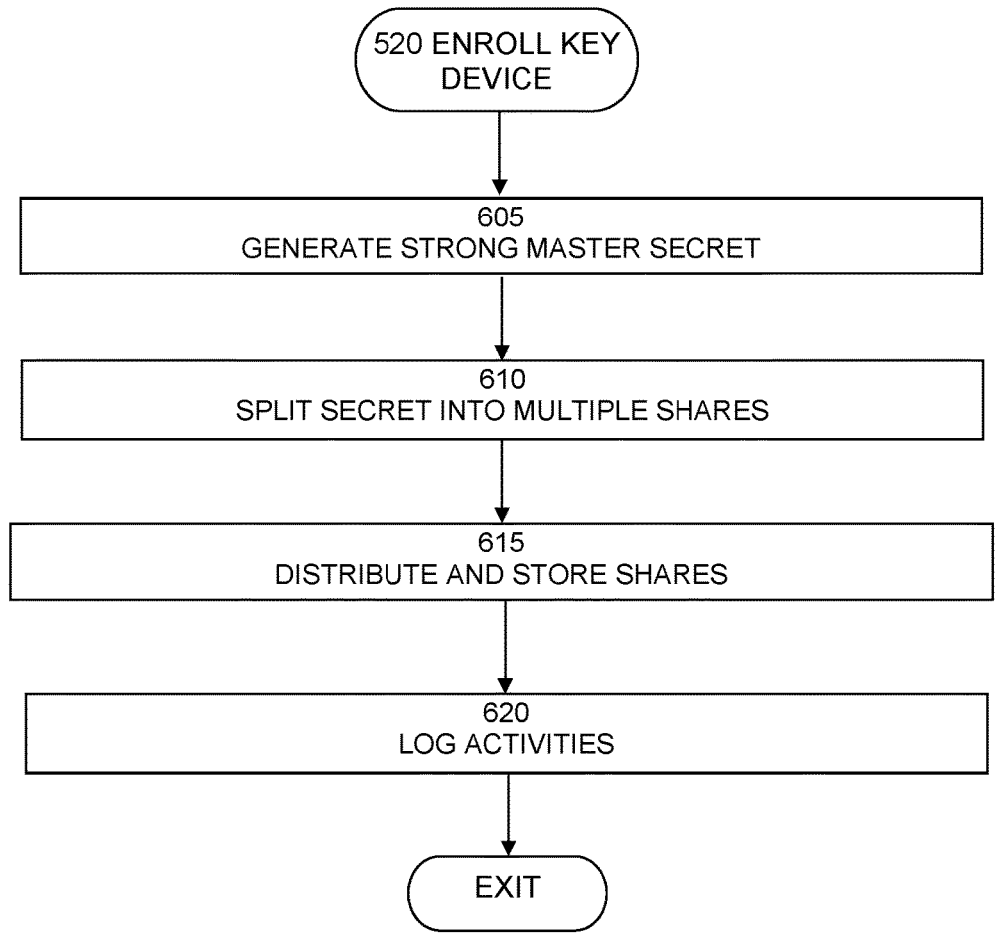
FIG. 6 is a detail level flowchart for the step of enrolling a key device configured in accordance with an embodiment.

FIG. 6 is a detail sub-figure flowchart 600 of step 520 in FIG. 5. Details for the step of an embodiment for enrolling a key device 505 comprise generating a strong master secret(s) 605; splitting secret(s) into multiple shares for key device and customized computing environment 610; distributing and storing shares 615; and logging activities 620. For embodiments, the device has an 'app' with a priori digital certificates, signed by a trusted certificate authority, that align with the computing environment/vehicle such that the certificates of both environments can be validated as authentic. In embodiments, the key split is hardware based (such as a PUF) as opposed to key ring based as that is a more secure way to store the key split value. Some embodiments are key ring based, protecting keys by encrypting them using a master key. This may particularly support retrofit applications. In embodiments, both the device and computing environment generate and store their own keys. In embodiments, the device generates all keys and distributes keys to the computing environment to store. Note that 'strong master secret' is basically synonymous with 'strong password' or 'strong key'. The term is meant to indicate a secret value, or key, which is generated on a true Random Number Generator (RNG) with sufficient entropy to protect the user's data. Should a true RNG not be available on a basic smart phone (device) or computing environment, an app could securely request a true random number generated from a server in the cloud via a secure connection, for example.

Figure 7:
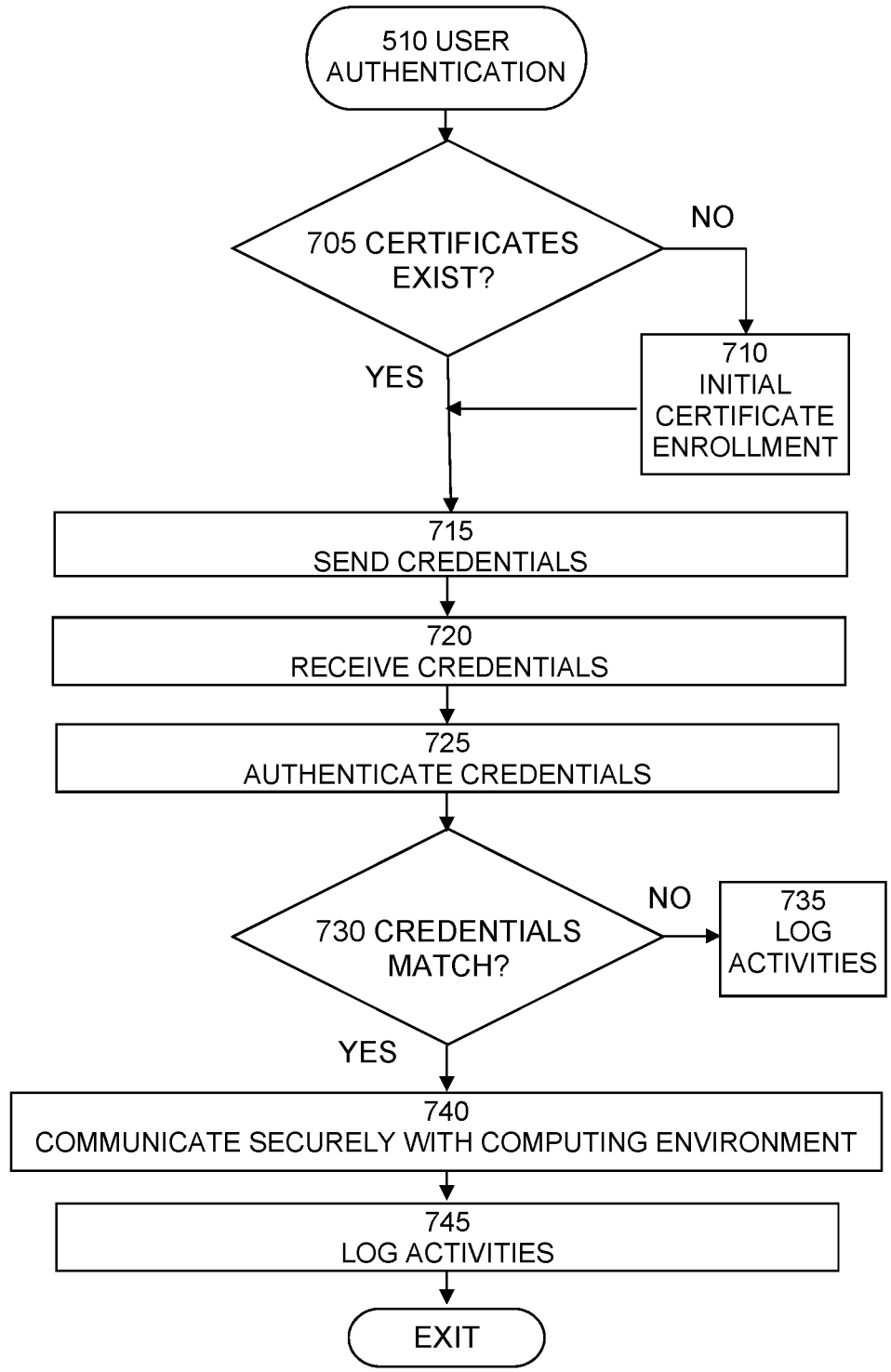
FIG. 7 is a detail level flowchart for the step of user validation configured in accordance with an embodiment.

FIG. 7 is a detail sub-figure flowchart 700 of step 510 in FIG. 5. Details for the step of user authentication 510 comprise determining if valid cryptographic certificates exist in both the device and computing environment 705, if they do not exist, initial certificate enrollment where both the device and the computing environment interact with a certificate authority to obtain valid digital certificates (one time interaction) 710, sending credentials 715; receiving credentials 720; authenticating credentials 725; do credentials match? 730; if credentials do not match, log 735 and return; if credentials do match, communicate securely with computing environment 740; and log activities 745. In embodiments, the user may enter biometric features or a password on the device. This unlocks their digital certificates, and unlocks or regenerates their half of a split key. In embodiments, a secondary input mechanism comprises the computing environment controls. In embodiments a tertiary input mechanism could be a biometric fob or dongle. In embodiments the one-time registration of certificates between the device and each computing environment is necessary such that the device and computing environment are trusted and can communicate securely.

Figure 8:
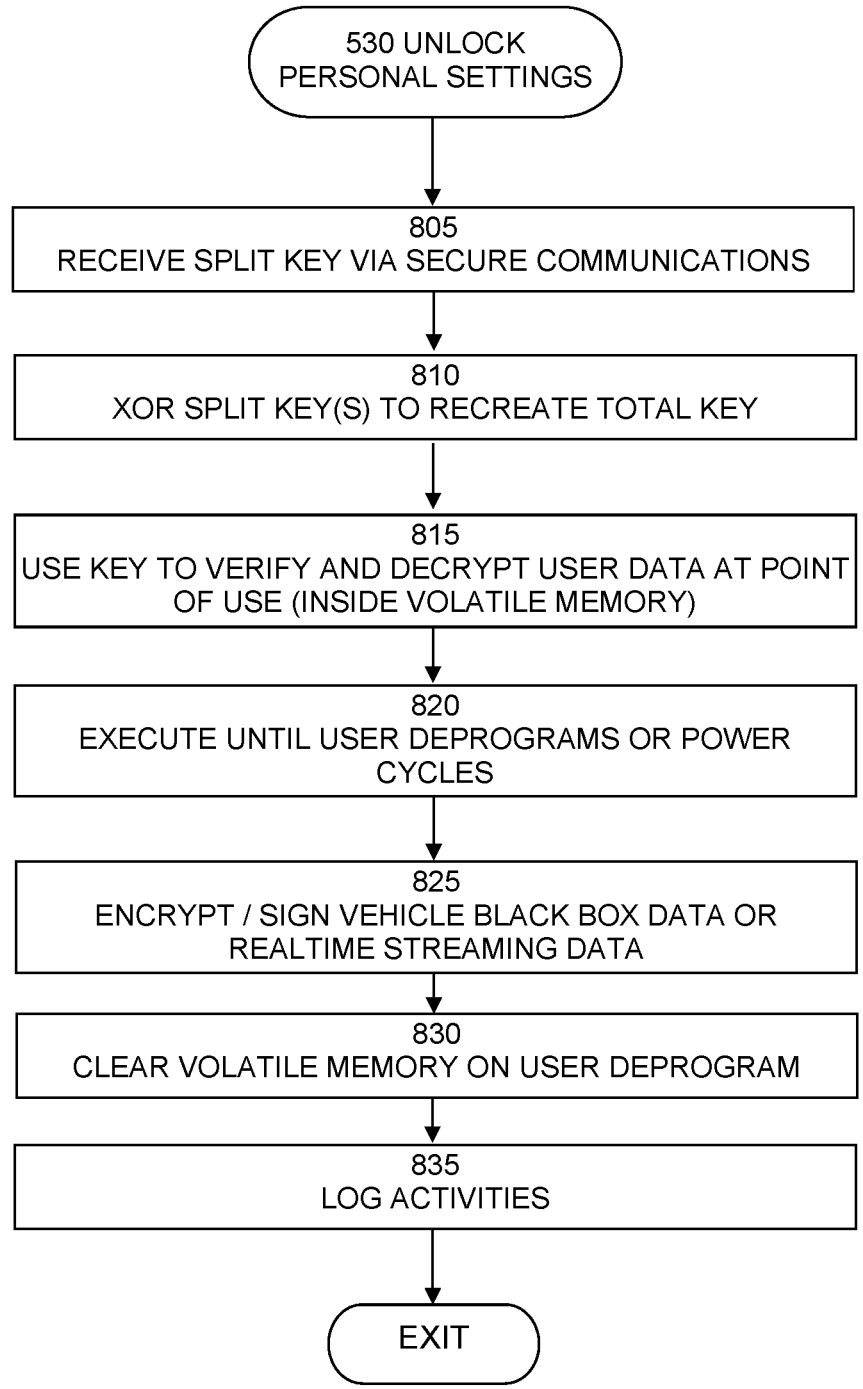
FIG. 8 is a detail level flowchart for the step of unlocking personal settings configured in accordance with an embodiment.

FIG. 8 is a detail sub-figure flowchart 800 of step 530 in FIG. 5. Details for the step of unlocking personal settings 530 comprise receiving split key(s) through a secure transaction mechanism 805; XOR split key(s) to recreate total key(s) 810; using key(s) to verify and decrypt user data at point of use (inside volatile memory) 815; executing until user deprograms or power cycles 820 (note that, in this step, if the system does not power cycle, the user's information needs to be cleared from volatile memory); encrypt/sign vehicle black box data or realtime streaming data (sensor data exported to third parties) 825; clear volatile memory on user deprogram 830; logging activities 835; and exiting. For embodiments, the full key is regenerated on the computing environment only if the authentication steps in FIG. 7 are valid. Maintaining half of the key in the user's device ensures that the encrypted data on the computing environment/vehicle is secure. In embodiments, the communication environment/vehicle and device communicate via an Interface Communications Document (ICD). This ICD defines an encrypted, authenticated, channel between the device and the entity/computing environment/vehicle such that all data passed over the channel is secure, an example being SSL. This is necessary to ensure the confidentiality of any data or keys passed between the user's device and the computing environment. For some embodiments, particularly retrofit applications which may be memory and processor limited, the secured communications channel allows for complex processing to occur on the user's device. In this case, the full key could be recreated on the user's device, and data streamed from the computing environment for encryption, signing, and storage on the user's device.

The key device unlocks personal settings of the computing environment/vehicle, including but not limited to: infotainment settings, paid content, climate control settings, seating position, radio presets, sensor data export preferences, payment information, etc. In embodiments, the key device is also utilized to encrypt and sign vehicle black box data to ensure the confidentiality, authenticity and integrity of that data. For embodiments, this data can be securely uploaded either to the cloud via OTA or to the device as it is encrypted. Embodiments include in the ICD a method to regenerate the vehicle half of the key such that the user is able to authenticate and decrypt their data in the cloud or on other connected computing environments. In embodiments, full key, unencrypted, vehicle black box data and any user personal data only execute in volatile memory such that a power cycle clears user data. In embodiments for key management simplification, a step is included where the data is re-encrypted with a public/private key pair for upload to the cloud. Here, data from the computing environment is placed in the cloud with a public/private key pair to limit user and vehicle interaction if that data is data the user is willing to release to a third party, or that data requires less protections. Such as would be the case of selling vehicle generated sensor data to a third party, or releasing maintenance data to the OEM. These embodiments are especially beneficial for applications such as rental cars, shared vehicles, aircraft interiors, hotel rooms, offices, business computers, and training simulators where a customized experience is desired, and no recoverable personal data is left behind. Further embodiments allow for the uploading of data to the cloud via OTA based on PKI or blockchain.

Figure 9:
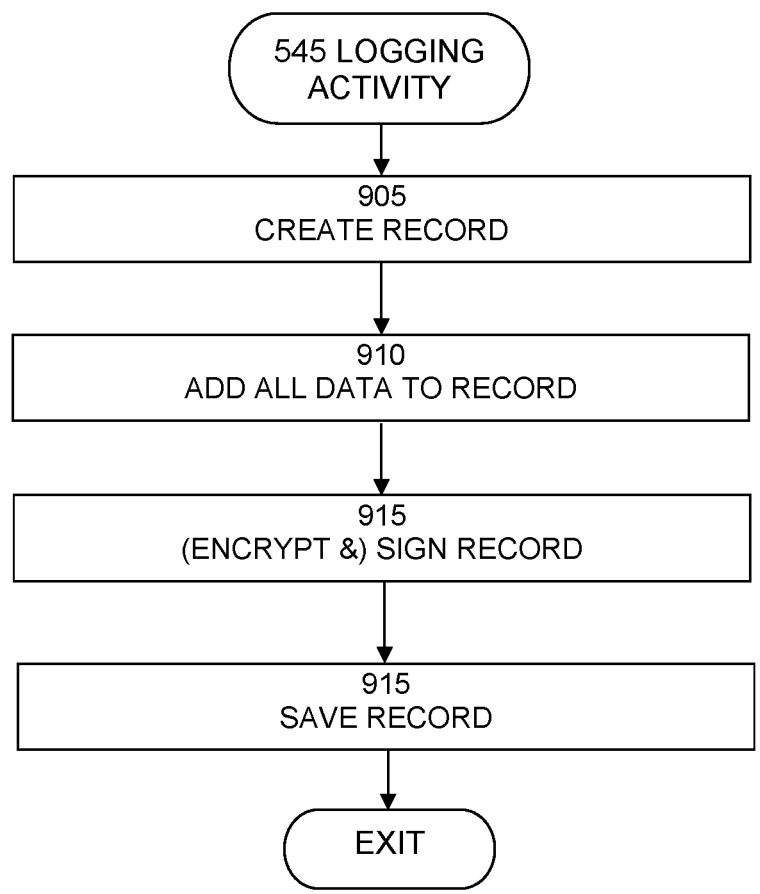
FIG. 9 is a detail level flowchart for the step of logging activities configured in accordance with an embodiment.

FIG. 9 is a detail sub-figure of FIG. 5 step 545. Details for the step of logging the activity comprise: creating record 905; adding all data to record 910; (encrypt and) sign record 915; and save record 920. For embodiments, the key is not added to the record as that would not be secure. For embodiments, the record would include the VIN, date, user, and description of the operations. In embodiments that encrypt and sign record 915, logged data is protected from reverse engineering.

Figure 10:
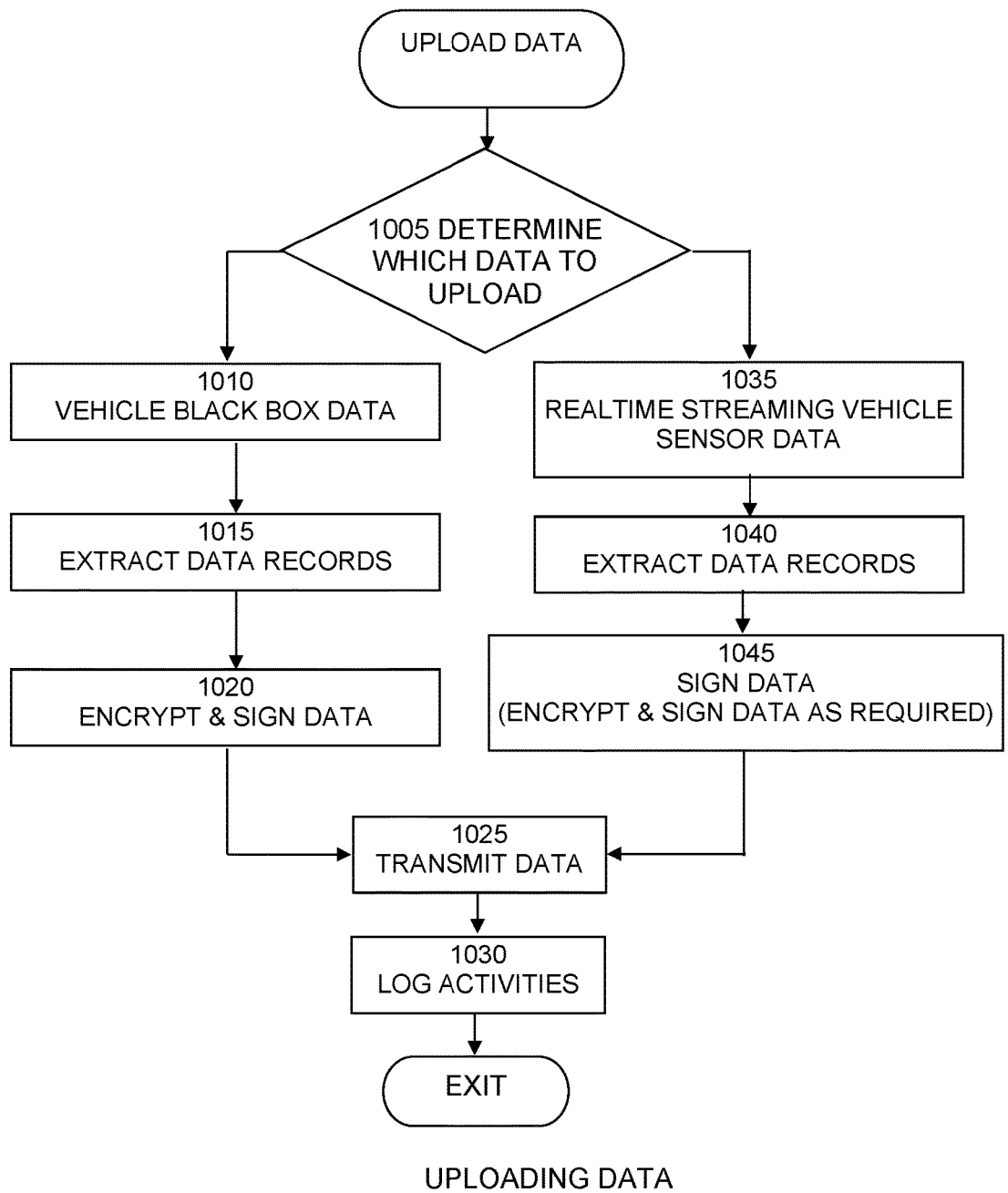
FIG. 10 is a detail level flowchart for the step of uploading data configured in accordance with an embodiment.

FIG. 10 is a flow chart 1000 of details for the steps of uploading data. They comprise: determining which data to upload 1005; for black box data 1010 or data which the user desires more control over; extract the data records to upload 1015; encrypt and sign the data records 1020; transmit via OTA or in other embodiments via near field communications 1025; log activities 1030; and exit. For data which the user is providing to a paid service, data which is time sensitive, or data which the user has otherwise agreed to release (realtime streaming sensor data) 1035; extract the data records 1040; sign at a minimum to ensure authenticity and integrity, or encrypt and sign for greater protections 1045; transmit via OTA or near field communications 1025; log activities 1030; and exit. In embodiments where the uploaded data is split key encrypted, all portions of the key are required to verify and decrypt the data. For other embodiments, PKI or blockchain are utilized.

Figure 11:
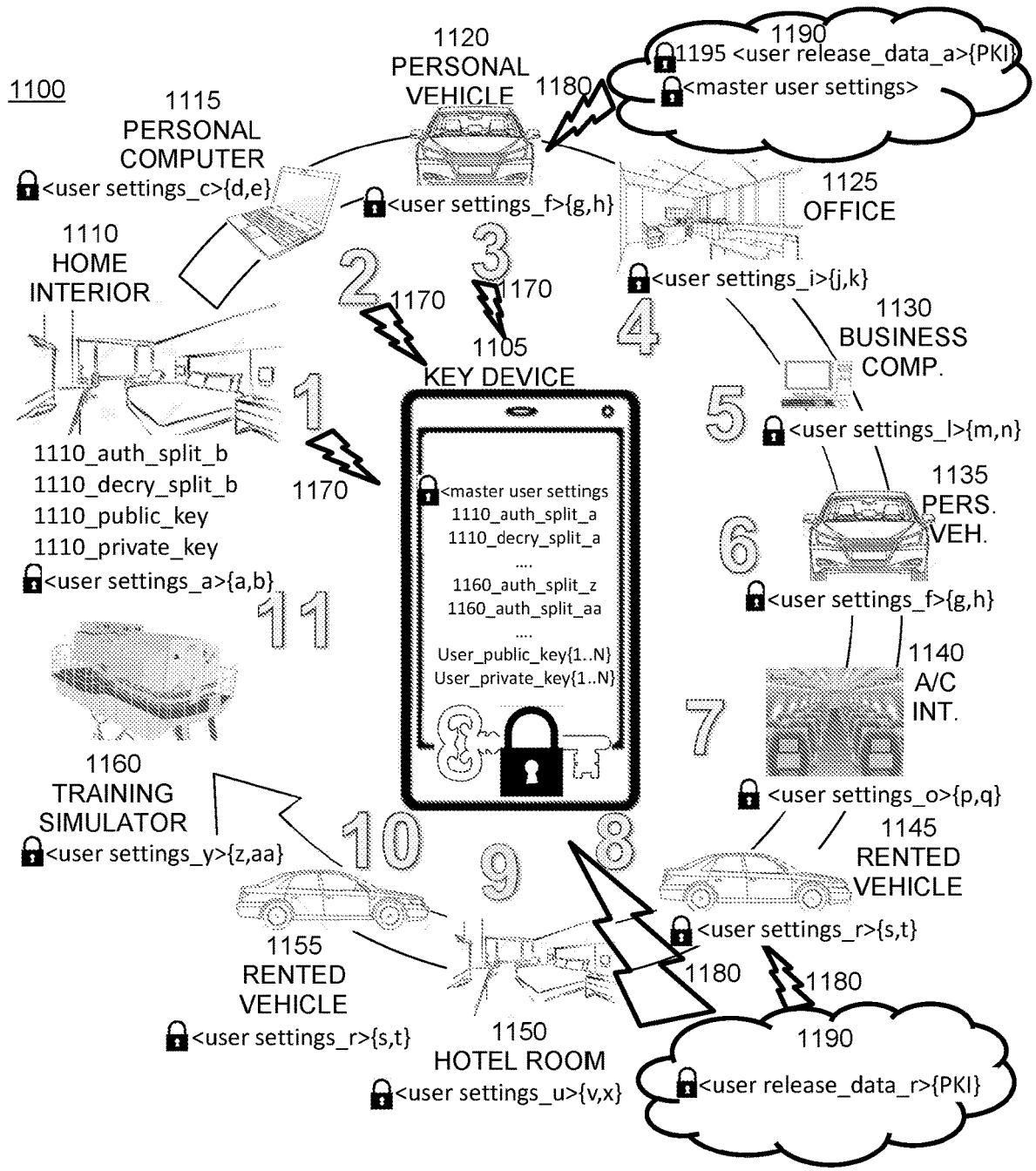
FIG. 11 is a depiction of an example scenario configured in accordance with an embodiment.

FIG. 11 is a depiction of an example scenario 1100. The example is an eleven-step business training trip for a pilot for flight training in a simulator. The eleven steps of the trip comprise: the pilot's key device such as a smart phone which contains key splits for each computing environment with which the pilot will interact, public and private keys based on a certificate authority, and the user's master settings and data 1105; computing environments that are securely configurable beginning with the pilot's home interior including the key splits which correspond to the user's device (not show in all other environments), the computing environments public and private keys based on a certificate authority (also not shown in all other environments), and the users settings and data which are split key encrypted and signed 1110 from which residential preferences are synced to his device (step 1) and are stored to his master user settings and data on his device 1170; his/her personal computer 1115 from which personal information for the trip is desired (step 2) communicated via 1170; personal vehicle 1120 for the commute to the office before the flight to the business destination (step 3) on which paid music and traffic content is streaming and environmental data 1200, is released to a third party; office 1125 from which business preferences and addresses relevant to the trip are desired (step 4); business computer 1130 from which relevant data is needed (step 5); personal vehicle trip to the airport 1135 (step 6); aircraft interior preferences 1140 for flight to the business trip destination (step 7) such as continuation of paid content streaming services from home interior; rental vehicle 1145 at the destination airport (step 8) which continues to stream the paid content from his personal vehicle and has the relevant business trip addresses automatically loaded for use by the navigation system; hotel room 1150 near the business trip destination (step 9) that utilizes the temperature and lighting set points from his home interior and continues to stream paid content from the home and aircraft interior; rental vehicle for the trip from the hotel to the business trip training simulator destination 1155 (step 10); and the training simulator 1160 at business trip destination for pilot training (step 11) which provides relevant data back to his business computer and office. In embodiments, much of the communication with the securely configurable environments for the trip is in the cloud. In embodiments the device contains the master user settings, and provides the method for the user to automatically configure all computing environments with their desired settings and data. The following describes the processing associated with each step of the business trip.

The user's device, 1105, contains an app that manages the cryptographic interactions with their computing environments, stores their 'master settings/data' and acts as the key management repository for their halves of the split keys. At the end of the trip, the device contains authentication and decryption split keys for all 11 computing environments and the user's public/private key pairs for PKI based interactions with those computing environments. The user's device communicates with each computing environment via secure communications that are based on certificate agreements between the device and the computing environments, such that the device and each computing environment need a valid set of certificates 1170. Within each computing environment, the 1110 home interior for example, there are user settings/data that are encrypted and signed with the XOR of the keys held by both the device and the computing environment. As shown at each step in the trip, the user's settings and data for each computing environment are different, and encrypted and signed with different key sets when stored in the computing environment. Thus if the data/settings for one computing environment are compromised, those of the other computing environments cannot readily be compromised other than through brute force cryptographic methods against the computing environments. During the trip, the computing environments may communicate with the cloud as shown where the personal vehicle 1120 is uploading sensor data 1195 to the cloud 1190 via OTA communications 1180. In this case, the sensor data 1195 is signed with the user's private key for release to the data aggregator such that the aggregator could validate authenticity and integrity. The rented vehicle 1145 also uploads generated data to the cloud based on the settings of the personal vehicle 1120, 1190, via OTA 1180. User device 1105 maintains the master user settings file and is the synchronization point for all the user's settings from all the computing environments. The user's device and computing environments communicate securely (1170) such that the device contains the master user settings/data to propagate to other computing environments, and computing environments can propagate updates to the cloud or the user's device. In some embodiments, this master user data/settings may be stored encrypted in the cloud for retrieval by the device or other computing environments that would later interact with a device to obtain the split keys.

The computing system used for the cryptographic verification of vehicle authenticity for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A system for securely customizing a computing environment for a user based on cryptographic protections comprising:
   providing a key device;
   bringing said key device proximate to said computing environment;
   authenticating comprising at least one of comparing key device and computing environment certificates;
   determining if previously enrolled for split key protections;
   if not enrolled, enrolling said key device;
   if enrolled, regenerating a split key;
   unlocking personal settings;
   using said computing environment with at least one of said personal settings and data;
   deprogramming said key device; and
   logging activity;
   whereby data and preferences are cryptographically protected.

2. The system for securely customizing a computing environment according to claim 1, wherein said in said step of deprogramming, user data and information that may reside on said computing environment is made opaque via encryption and signing.

3. The system for securely customizing a computing environment according to claim 1, wherein configurable components comprise at least one of:
   Payment information;
   User preferences;
   Environment generated data;
   User input data;
   User history;
   Privacy settings;
   Purchased content and content settings;
   User personally identifiable information;
   Environmental settings;
   Performance settings, and
   a Cloud connection (260).

4. The system for securely customizing a computing environment according to claim 1, wherein elements of said customized environment comprises at least one of:
   vehicle over the air (OTA) communications;
   Bluetooth communications;
   Dedicated Short-Range Communications (DSRC) vehicle to everything communications;
   passive keyless entry;
   remote key;
   Advanced Driver Assistance Systems (ADAS);
   lighting system;
   engine and transmission performance;
   steering and braking performance;
   vehicle access systems; and
   remote link type apps.

5. The system for securely customizing a computing environment according to claim 1, wherein key management comprises at least one of:
   a key in said user's device;
   a key in an automotive CPU;
   an exclusive or (XOR), wherein either said key in said user's device or said key in an automotive CPU is true;
   producing at least one of user and vehicle key(s);
   verifying and decrypting;
   encrypting user files with said at least one user/vehicle key(s); and
   decrypting said user files and executing in volatile memory.

6. The system for securely customizing a computing environment according to claim 1, wherein said customized computing environment comprises at least one of:
   a vehicle.

7. The system for securely customizing the computing environment according to claim 1, further comprising enrolling said key device, said step of enrolling comprising:
   generating a strong master secret;
   splitting sad strong master secret into multiple shares for said key device and customized computing environment;
   distributing and storing shares; and
   logging activities.

8. The system for securely customizing a computing environment according to claim 1, wherein user validation comprises:
   sending credentials;
   receiving credentials;
   authenticating credentials;
   confirming credentials match;

logging and returning if credentials do not match;
communicating with computing environment if credentials do match; and
logging activities.

9. The system for securely customizing a computing environment according to claim 1, wherein said step of unlocking comprises:
receiving a split key through a secure transaction mechanism;
XOR split key to recreate total key;
verifying and decrypting at point of use; and
logging activities.

10. The system for securely customizing a computing environment according to claim 1, wherein said step of logging activity comprises:
creating a record;
adding all data to said record;
encrypting and signing said record; and
saving said record.

11. The system for securely customizing a computing environment according to claim 1, wherein uploading data comprises:
determining which data to upload;
for restricted access or black box data:
extracting data records to upload;
encrypting and signing said data records;
transmitting via OTA; and
logging activities;
for streaming sensor data:
extracting data records;
signing at a minimum to ensure authenticity and integrity, or encrypting and signing for greater protections;
transmitting via OTA; and
logging activities.

12. The system for securely customizing a computing environment according to claim 1, wherein said full key generated on said computing environment uses a stored second half of split key.

13. The system for securely customizing a computing environment according to claim 1, comprising separate keys for decryption and authentication such that there are multiple split values and multiple exclusive ors (XORs) to arrive at one key for decrypting and another for authenticating.

14. The system for securely customizing a computing environment according to claim 1, wherein said computing environment comprises at least one of:
a vehicle; and
wherein elements of said customized environment comprise:
vehicle Over The Air (OTA) communications;
Bluetooth communications;
Dedicated Short-Range Communications (DSRC) vehicle to everything (V2X) communications;
passive keyless entry;
remote key;
Advanced Driver Assistance Systems (ADAS);
lighting system (interior and exterior);
engine and transmission performance;
steering and braking performance;
vehicle access systems; and
remote link type apps.

15. The system for securely customizing a computing environment according to claim 1, wherein said computing environment comprises at least one of:
a vehicle; and
wherein said configurable components comprise:
Payment information;
User preferences;
Environment generated data;
User input data;
User history;
Privacy settings;
Purchased content and content settings;
User personally identifiable information;
Environmental settings;
Performance settings, and
a Cloud connection.

16. A method for securely customizing a computing environment for a user based on cryptographic protections comprising:
providing a key device;
bringing said key device proximate to said computing environment;
authenticating comprising comparing ate least one of key device and computing environment certificates;
determining if previously enrolled for split key protections;
if not enrolled, enrolling said key device;
if enrolled, regenerating split key;
unlocking personal settings;
using said computing environment with at least one of said personal settings and data;
deprogramming said key device; and
logging activity;
wherein all data and preferences are cryptographically protected via split key execution in at least one of volatile memory and a virtual machine and one half of said split is held by said user key device.

17. The method for securely customizing a computing environment for a user based on cryptographic protections of claim 16 wherein said computing environment comprises a personal computer.

18. The method for securely customizing a computing environment for a user based on cryptographic protections of claim 16, wherein said computing environment comprises a training simulator.

19. The method for securely customizing a computing environment for a user based on cryptographic protections of claim 16, wherein deprogramming comprises memory power cycling.

20. A system for securely customizing a computing environment for a user based on cryptographic protections comprising:
providing a key device;
enrolling said key device comprising:
generating a strong master secret;
splitting sad strong master secret into multiple shares for key device and customized computing environment;
distributing and storing shares; and
logging activities
bringing said key device proximate to said computing environment;
authenticating;
at least one of unlocking and regenerating a split key of said device;
if authentication of said certificates is not valid, log and return to said step of bringing said key device proximate to said computing environment;
using said computing environment with said personal settings, wherein using said computing environment with said personal settings comprises configurable components comprising:
Payment information;
User preferences;

Environment generated data;
User input data;
User history;
Privacy settings;
Purchased content and content settings;
User personally identifiable information;
Environmental settings;
Performance settings, and
Cloud connection;
deprogramming; and
logging activity;
wherein said customized computing environment is at least one of:
a personal vehicle;
wherein all data and preferences are cryptographically protected via split key execution in at least one of a volatile memory and a virtual machine and one half of said split is held by said user key device.

* * * * *